(12) United States Patent
Nishio et al.

(10) Patent No.: US 6,714,375 B2
(45) Date of Patent: Mar. 30, 2004

(54) MAGNETIC RECORDING AND REPRODUCING APPARATUS AND MAGNETIC TAPE ACCESSING METHOD

(75) Inventors: Tsuyoshi Nishio, Kanagawa (JP); Takayuki Horikoshi, Kanagawa (JP); Shinya Morita, Kanagawa (JP)

(73) Assignee: Sony Corporation, Tokyo (JP)

( * ) Notice: Subject to any disclaimer, the term of this patent is extended or adjusted under 35 U.S.C. 154(b) by 312 days.

(21) Appl. No.: 09/804,501

(22) Filed: Mar. 12, 2001

(65) Prior Publication Data

US 2001/0036029 A1 Nov. 1, 2001

(30) Foreign Application Priority Data

Mar. 13, 2000 (JP) ........................................ 2000-073897

(51) Int. Cl.⁷ ........................... G11B 17/00; G11B 15/48
(52) U.S. Cl. ..................... 360/72.2; 360/74.1; 360/48
(58) Field of Search ........................... 360/48, 69, 72.1, 360/72.2, 74.1, 74.4

(56) References Cited

U.S. PATENT DOCUMENTS

| 5,774,288 A | * | 6/1998 | Kikuchi et al. | ............... 360/48 |
| 5,872,667 A | * | 2/1999 | Adams et al. | ................ 360/48 |
| 6,124,993 A | * | 9/2000 | Hallamasek | .................. 360/48 |
| 6,301,067 B1 | * | 10/2001 | Takayama | ..................... 360/48 |

* cited by examiner

*Primary Examiner*—Andrew L. Sniezek
(74) *Attorney, Agent, or Firm*—Frommer Lawrence & Haug LLP; William S. Frommer; Glenn F. Savit

(57) ABSTRACT

A magnetic recording and reproducing apparatus according to the invention involves unloading a magnetic tape after the tape is positioned to one of its unloading regions which is located approximately in the middle of a lengthwise tape area where user data have been recorded. Such unloading regions are located at predetermined intervals along the magnetic tape. Through designation of an operation mode, the apparatus of the invention also permits selecting one of two unloading regions to which the magnetic tape is positioned before being unloaded. One of the two regions is located approximately in the middle of the user data-packed tape area, the other region designated by a host device. This manner of unloading allows the inventive apparatus to access desired locations on the magnetic tape at a significantly higher speed than conventional devices.

3 Claims, 12 Drawing Sheets

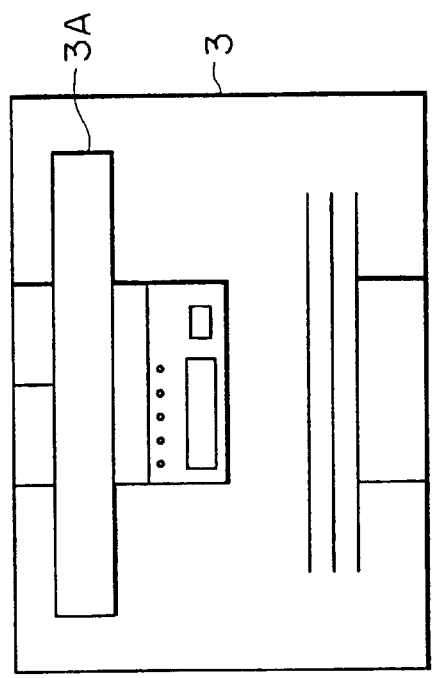
F I G. 3 A
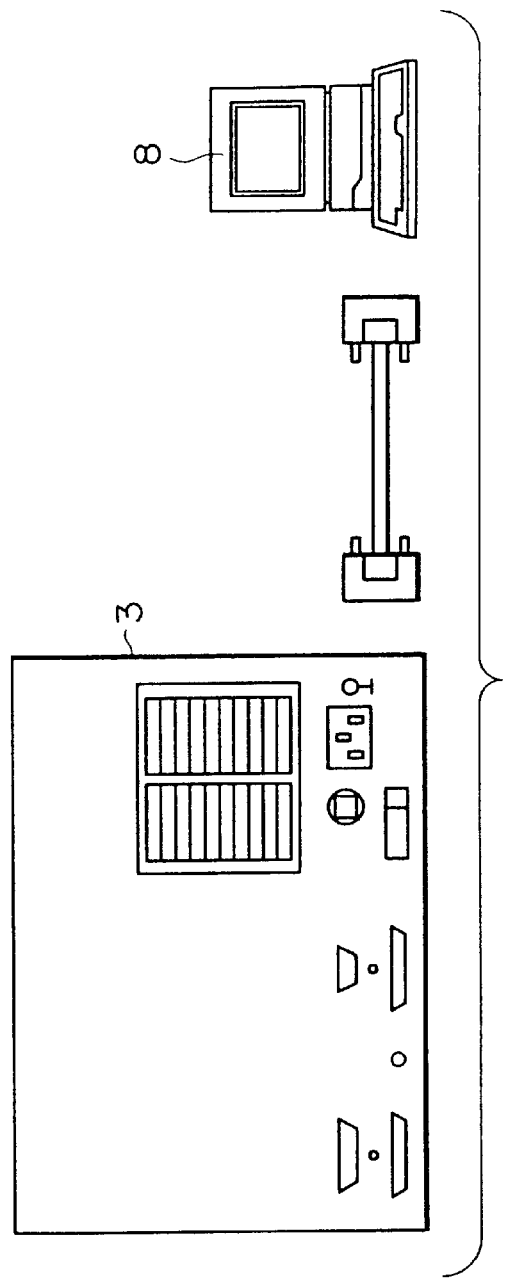
F I G. 3 B

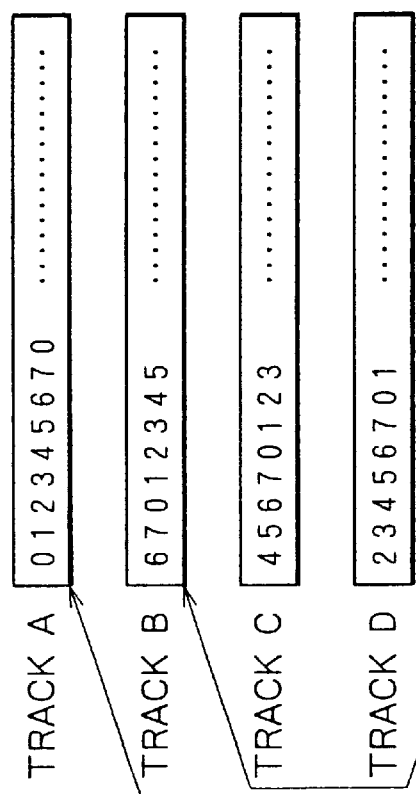
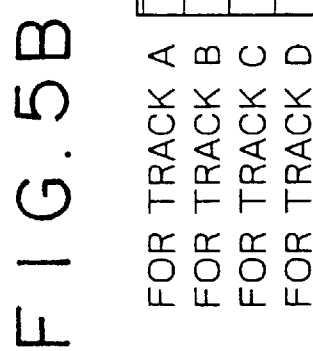
FIG. 5A
FIG. 5B

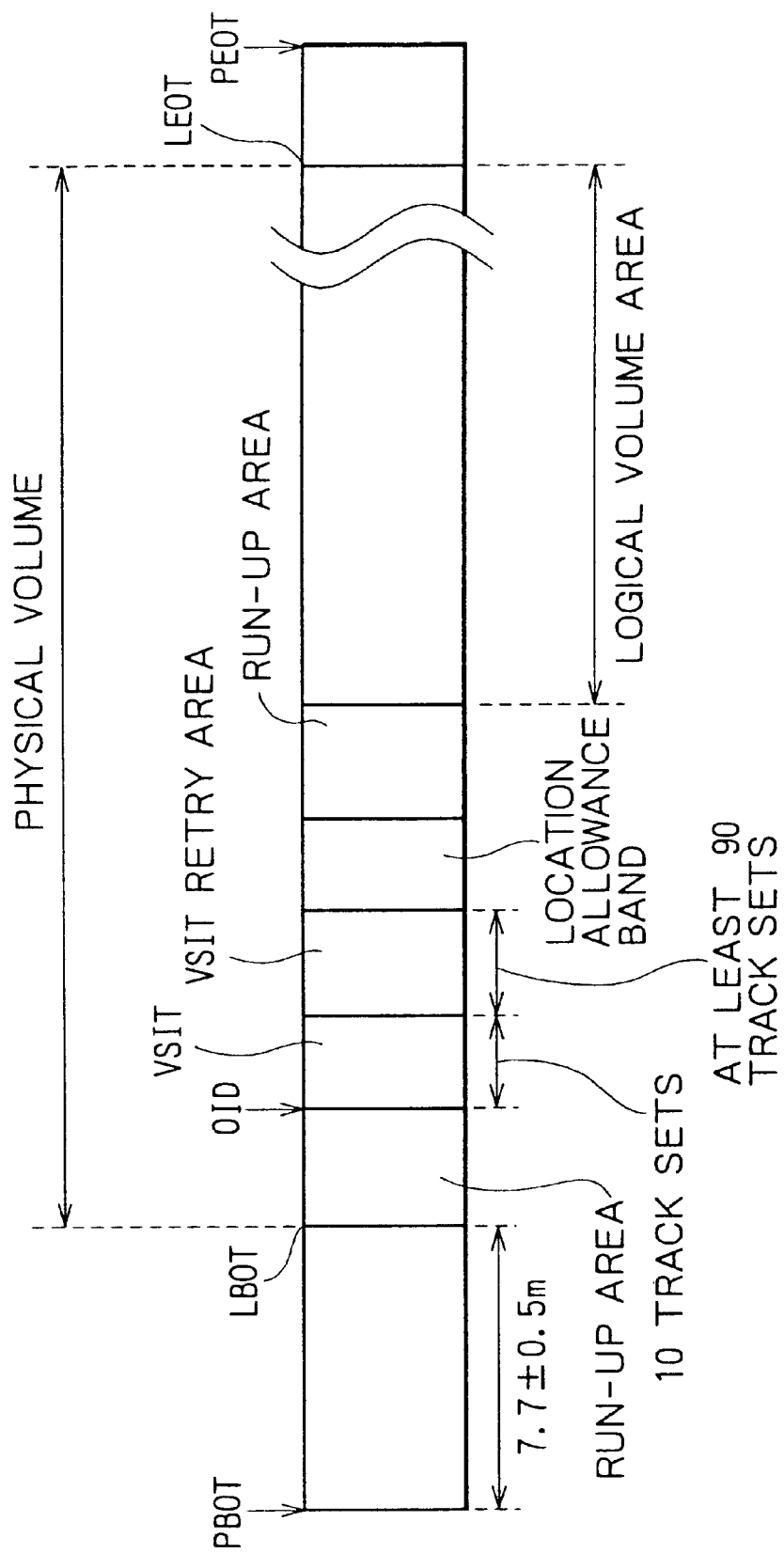

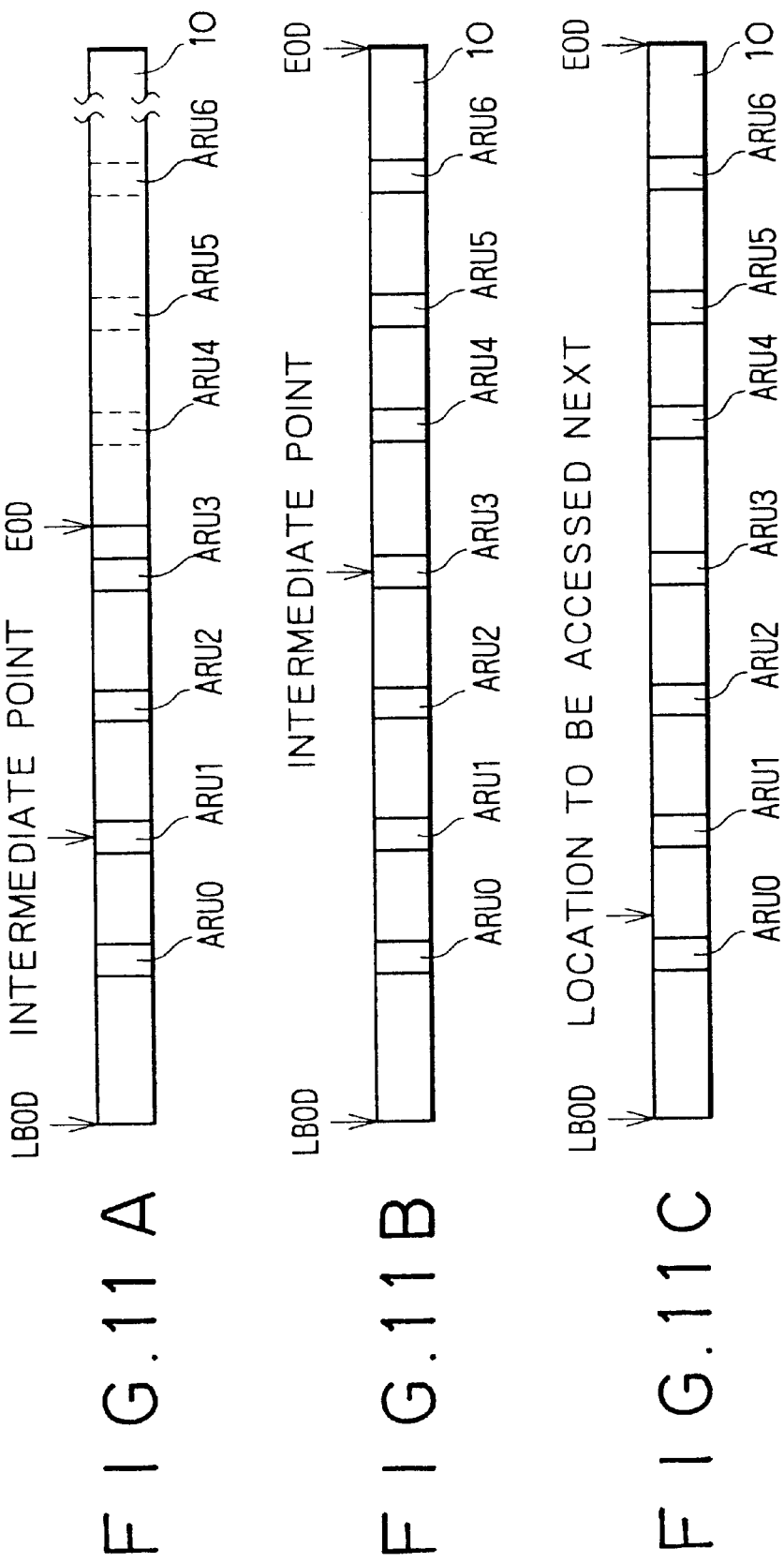

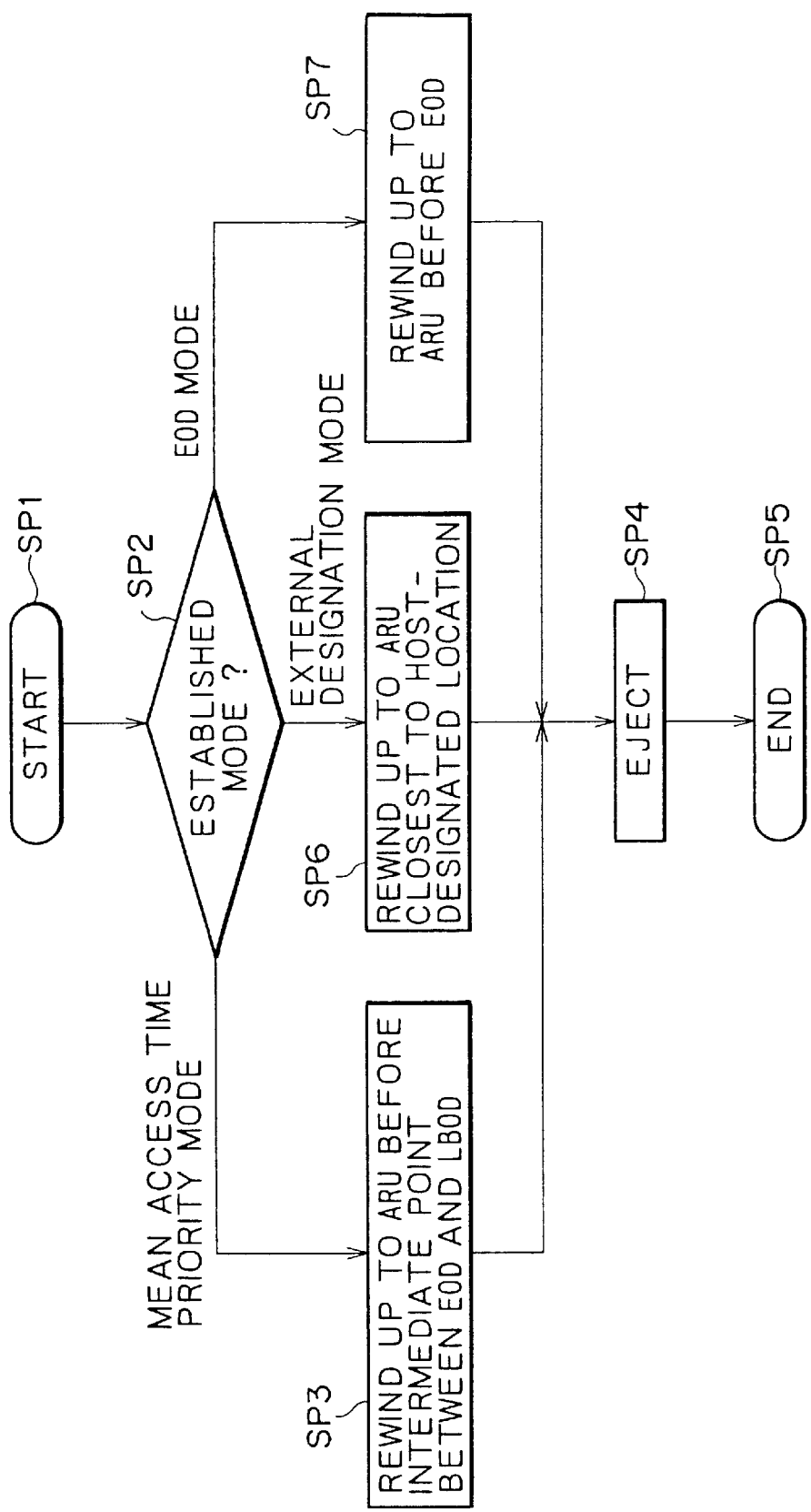

MAGNETIC RECORDING AND REPRODUCING APPARATUS AND MAGNETIC TAPE ACCESSING METHOD

BACKGROUND OF THE INVENTION

The present invention relates to a magnetic recording and reproducing apparatus and a method for accessing magnetic tapes using the apparatus. More particularly, the invention relates to a tape streamer to which data in such devices as servers are backed up. The inventive apparatus and method involve unloading a magnetic tape from a tape streamer after the tape is positioned to one of its unloading regions which is located approximately in the middle of a lengthwise tape area where user data have been recorded. Such unloading regions are located at predetermined intervals along the magnetic tape. The inventive apparatus and method also involve permitting selection between two unloading regions to which the magnetic tape is positioned before being unloaded from the tape streamer. One of the two regions is located approximately in the middle of the user data-packed tape area, the other region designated by a host device. This manner of unloading a magnetic tape allows a desired file recorded thereon to be accessed significantly faster than conventional methods of tape unloading.

Tape streamers conventionally establish an unloading region at the beginning or the end of each magnetic tape on which data have been recorded with high density. The magnetic tape is positioned to its unloading region before being loaded or unloaded to or from the streamer so that the data-packed tape will not be damaged in other sensitive areas during the loading or unloading process.

However, to load or unload a magnetic tape positioned to its unloading region at the beginning or end of tape requires that the tape be wound up to its beginning or end in advance. After recording, it takes time to wind up the tape all the way to get the tape cassette ready to be ejected. It also takes time to load a tape cassette into a recording and reproducing apparatus and fully wind up the tape before actually proceeding to record or reproduce data to or from the tape. In order to circumvent such disadvantages, some tape streamers have been proposed which establish unloading regions at locations other than the beginning or the end of tape. With this kind of tape streamers, the magnetic tape may be unloaded as positioned to its nearest unloading region.

Having studied conventional and related structures, the inventors of this invention envisioned a novel tape streamer and a method for operating it whereby a desired file on a magnetic tape would be accessed much faster than by conventional setups.

SUMMARY OF THE INVENTION

The present invention has been made in view of the above circumstances and provides a magnetic recording and reproducing apparatus permitting significantly faster access to desired data storage locations than its conventional counterparts.

In carrying out the invention and according to one aspect thereof, there is provided a magnetic recording and reproducing apparatus for positioning a magnetic tape to one of unloading regions thereon which is situated adjacent to a substantially intermediate point between an end of recorded user data and a beginning of the recorded user data along the magnetic tape, before unloading the magnetic tape thus positioned into a tape cassette. This structure minimizes mean access time.

According to another aspect of the invention, there is provided a magnetic recording and reproducing apparatus which, in a first operation mode, positions a magnetic tape to one of unloading regions thereon which is situated adjacent to a substantially intermediate point between an end of recorded user data and a beginning of the recorded user data along the magnetic tape, before unloading the magnetic tape thus positioned into a tape cassette; and which, in a second operation mode, further positions the magnetic tape to one of the unloading regions thereon which is designated by an external device, before unloading the magnetic tape thus positioned into the tape cassette. This structure also minimizes mean access time in different operations modes of unloading.

Other objects, features and advantages of the invention will become more apparent upon a reading of the following description and appended drawings.

BRIEF DESCRIPTION OF THE DRAWINGS

FIGS. 3A and 3B are a front view and a back view of a tape streamer as part of the backup system shown in FIG. 1;

FIGS. 5A and 5B are schematic views explaining a track interleave scheme of the tape streamer in FIGS. 3A and 3B;

FIG. 8 is a schematic view indicating a physical volume of an entire magnetic tape used by the tape streamer in FIGS. 3A and 3B;

FIGS. 11A, 11B and 11C are schematic views explaining unloading regions adopted by the tape streamer in FIGS. 3A and 3B; and FIG. 12 is a flowchart of steps constituting an unloading routine adopted by the tape streamer in FIGS. 3A and 3B.

DESCRIPTION OF THE PREFERRED EMBODIMENTS

Preferred embodiments of this invention will now be described with reference to the accompanying drawings.

1. Structure of the Backup System

Figure 1:
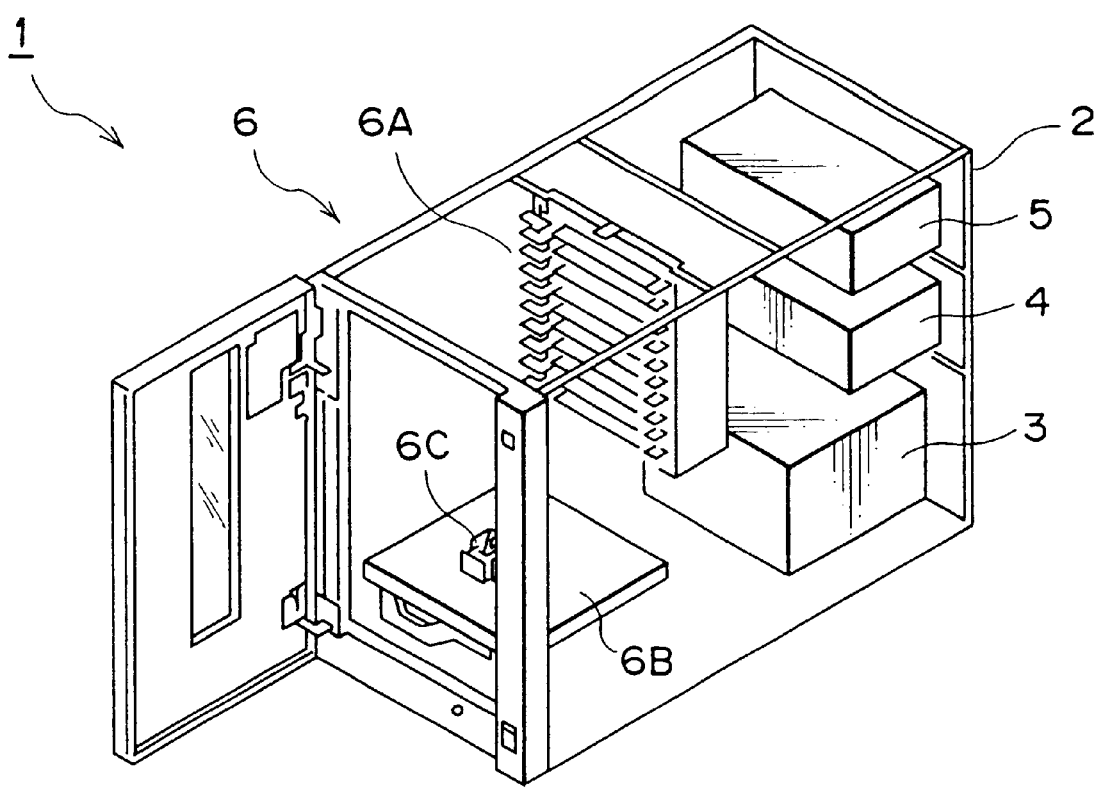
FIG. 1 is a perspective view of a backup system embodying this invention.

FIG. 1 is a perspective view of a backup system practiced as a first embodiment of this invention. The backup system 1 is formed by incorporating a tape streamer 3 and other devices into a large-sized console 2. Typically, the backup system 1 includes the tape streamer 3, a power supply unit 4 and a CPU unit 5, all located in the front of the console and stacked from bottom to top in that order, and a tape cassette transport 6 in the back.

The power supply unit 4 supplies power to various component parts of the backup system 1, and the CPU unit 5 provides overall control of the backup system 1. The tape streamer 3 records data coming from a host computer onto tape cassettes loaded by the transport 6, and reproduces data from the cassettes for output to the host computer.

The transport 6 is designed to house a plurality of tape cassettes on a shelf unit 6A. Under control of the CPU unit 5, the transport 6 carries a tape cassette from the shelf unit 6A to the tape streamer 3 and loads the cassette into the latter. The tape cassette ejected by the tape streamer 3 is transported back to the shelf unit 6A. The transport 6 comprises an elevator 6B and a hand block 6C. The elevator 6B moves up and down inside the console 2. The hand block 6C mounted on the elevator 6B hands over tape cassettes between the elevator 6B and the shelf unit 6A as well as between the elevator 6B and the tape streamer 3. Each tape cassette handled by the tape streamer 3 of this embodiment is equipped with a non-contact type IC tag at the back. The IC tag is accessed by a reader-writer attached to the shelf unit 6A and to the elevator 6B.

Figure 2:
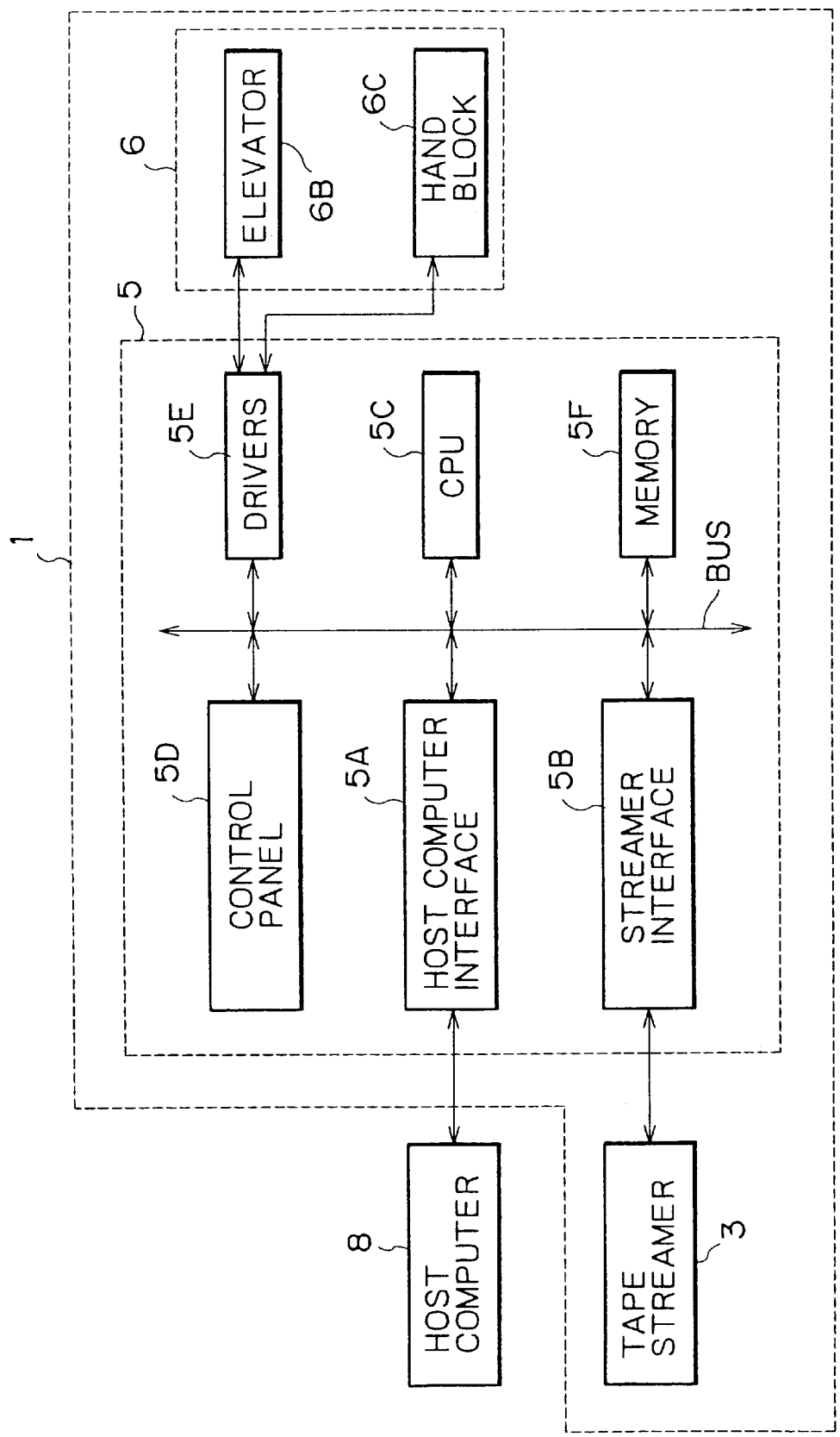
FIG. 2 is a block diagram of the backup system shown in FIG. 1.

FIG. 2 is a block diagram of the backup system 1 highlighting the CPU unit 5 accompanied by its peripherals. In the CPU unit 5, a host computer interface (IF) 5A is connected to a host computer 8 illustratively through a SCSI (Small Computer System Interface). The host computer interface 5A receives commands and write-ready data from the host computer 8 and places them onto an internal bus (BUS). Conversely, status data and reproduced data placed on the internal bus are forwarded by the host computer interface 5A to the host computer 8.

A streamer interface (IF) 5B is connected to the tape streamer 3 illustratively through a SCSI. Predetermined control commands and write-ready data are output over the internal bus to the tape streamer 3 by the streamer interface 5B; status data and reproduced data received from the tape streamer 3 are placed through the interface 5B onto the internal bus.

Located at the front of the console 2, a control panel 5D accepts various operations made by an operator and notifies a CPU 5C the operations thereof through the internal bus. Drivers 5E drive the elevator 6B and hand block 6C under control of the CPU 5C.

The CPU 5C secures a work area in a memory 5F to carry out necessary procedures in response to commands from the host computer 8, thus controlling the backup system 1 as a whole. Illustratively, given an access command from the host computer 8, the CPU 5C orders the tape streamer 3 to record or reproduce data to or from a loaded tape cassette. If the access command from the host computer 8 designates a tape cassette different from the currently loaded tape cassette in the tape streamer 3, the CPU 5C causes the transport 6 to remove the currently loaded cassette in exchange for the designated one. If the operator designates formatting of a so-called virgin tape (a magnetic tape on which no data have yet to be recorded), the CPU 5C causes the transport 6 to load the tape cassette in question into the tape streamer 3 before getting the tape streamer 3 to initialize the tape.

2. Tape Streamer

FIGS. 3A and 3B are a front view and a back view of the tape streamer 3. The tape streamer 3 has a loading port 3A at its front (FIG. 3A). Tape cassettes are loaded and unloaded through this loading port 3A. A variety of connectors are located at the back of the tape streamer 3. Using some of these connectors, the tape streamer 3 may illustratively be connected directly to the host computer 8 if the CPU unit 5 is not used.

3. Formatting by the Tape Streamer

Figure 4:
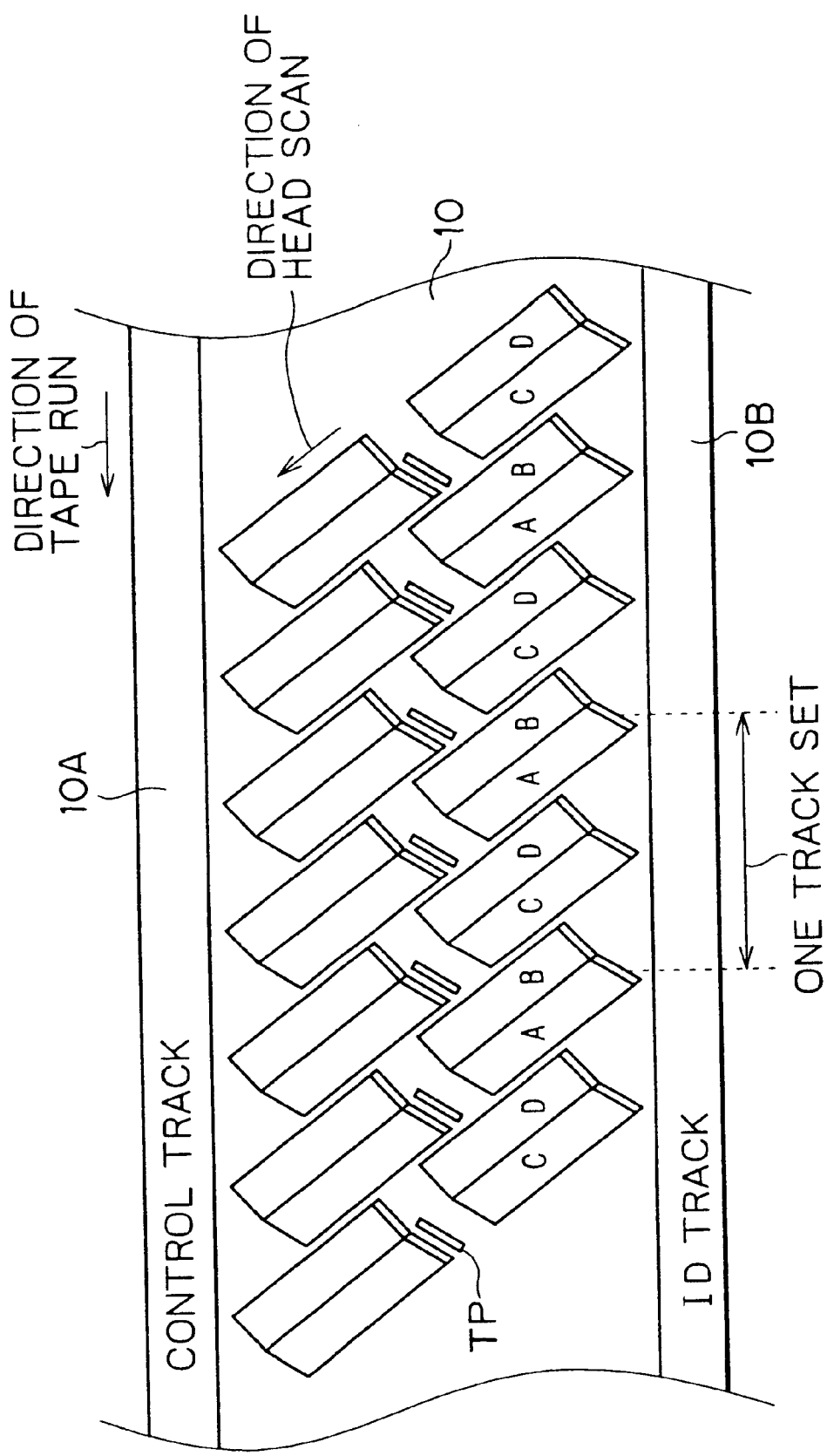
FIG. 4 is a schematic view of a recording format used by the tape streamer shown in FIGS. 3A and 3B.

FIG. 4 is a schematic view of a recording format used by the tape streamer 3. In formatting, the tape streamer 3 forms a lengthwise track along a top and a bottom margin of a magnetic tape 10 and produces tilted tracks between the two lengthwise tracks. One of the two lengthwise tracks is allocated as a controller track 10A to which a tracking control signal is recorded. The other lengthwise track is allocated as an ID track 10B to which information for managing the tilted tracks is recorded by use of a management table.

The tilted tracks are formed in units of a pair of recording tracks having a positive and a negative azimuth angle. Each tilted track is divided approximately in the middle lengthwise. Of each pair of recording tracks, the preceding track in the direction of tape run has a region TP formed in its bisected location. The region TP is a domain to which a pilot signal for tracking control is recorded.

Two pairs of recording tracks amounting to a total of four tracks constitute a single track set. The track set is the unit in which recording tracks are handled. For identification, each track set is assigned a track set ID constituting part of the information recorded to the ID track 10B. The track set ID includes a physical track set ID and a logical track set ID. The physical track set ID is incremented monotonously for every track set added. The logical track set ID is incremented monotonously for each of additional track sets except for dummy and EOD (end of data) fields. The track set IDs are converted to an SMPTE time code before being recorded to the ID track 10B.

The tilted tracks in each track set are designated as tracks A, B, C and D in that order in the direction of tape run. The four tracks correspond to the channels of a recording and reproducing apparatus.

The track sets fall into four major categories: a user track set used to record user data, a tape mark track set allocated as a tape mark indicative of a file delimiter, an EOD track set representative of an end of data, and a dummy track set constituting dummy tracks.

FIGS. 5A and 5B are schematic views showing relations between each track set on the one hand and an ECC block serving as an error correction unit on the other hand. The tape streamer 3 forms an ECC block by dividing user data and other recordings into units of a suitable block and by adding an error correcting code to each unit block. Illustratively, the tape streamer 3 allocates data made of eight ECC blocks to one track set. Each of the eight ECC blocks numbered 0 through 7 is divided into four equal portions in an outer parity direction. The divided portions are assigned to the tracks to be recorded under a track interleave scheme. The data allocated to the tracks are changed in sequence in a word interleave process before being recorded.

Figure 6:
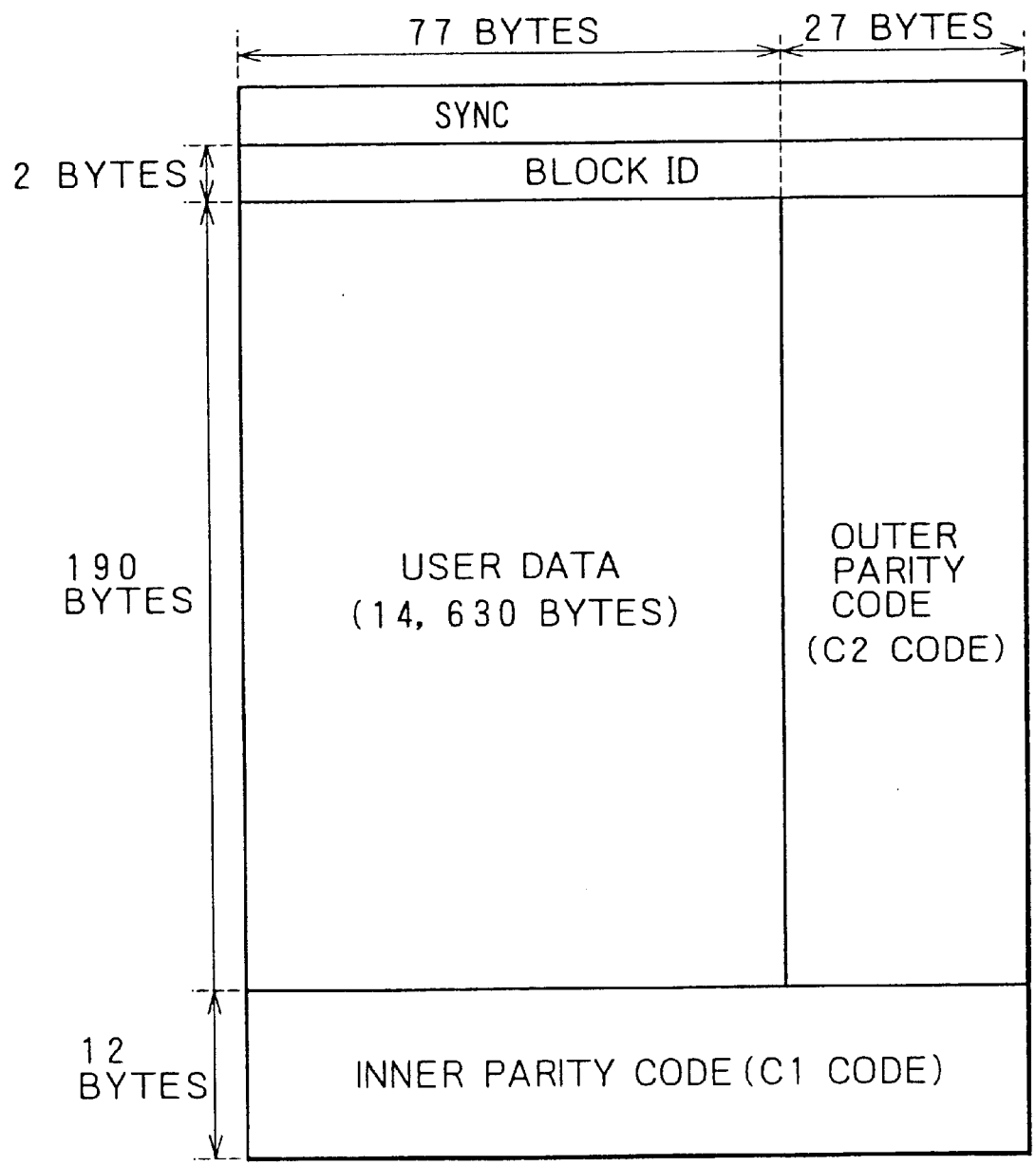
FIG. 6 is a schematic view depicting an ECC block adopted by the tape streamer in FIGS. 3A and 3B.

FIG. 6 is a schematic view depicting an ECC block. Each ECC block is assigned 77 by 190 bytes of data such as user data. A 27-byte outer parity check code is generated and added to each 77-byte data column. After addition of a two-by-104-byte block ID to the data column, a 12-byte inner parity check code is generated in a direction perpendicular to the outer parity check code and is added to a 192-byte data column including the block ID.

Each ECC block is thus supplemented with an error correcting code in the form of a product code. The ECC block is complete when further supplemented with a four-by-104-byte synchronizing pattern SYNC. With this embodiment, the block ID constitutes an ECC block ID, and the synchronizing pattern SYNC is a specific pattern indicating the beginning of an ECC block.

As described, the tape streamer 3 forms each ECC block by incorporating 77 by 190 bytes of data such as user data, and forms a single track set out of eight ECC blocks. As a result, each track set is assigned 117,040 bytes of user or other data.

Figure 7:
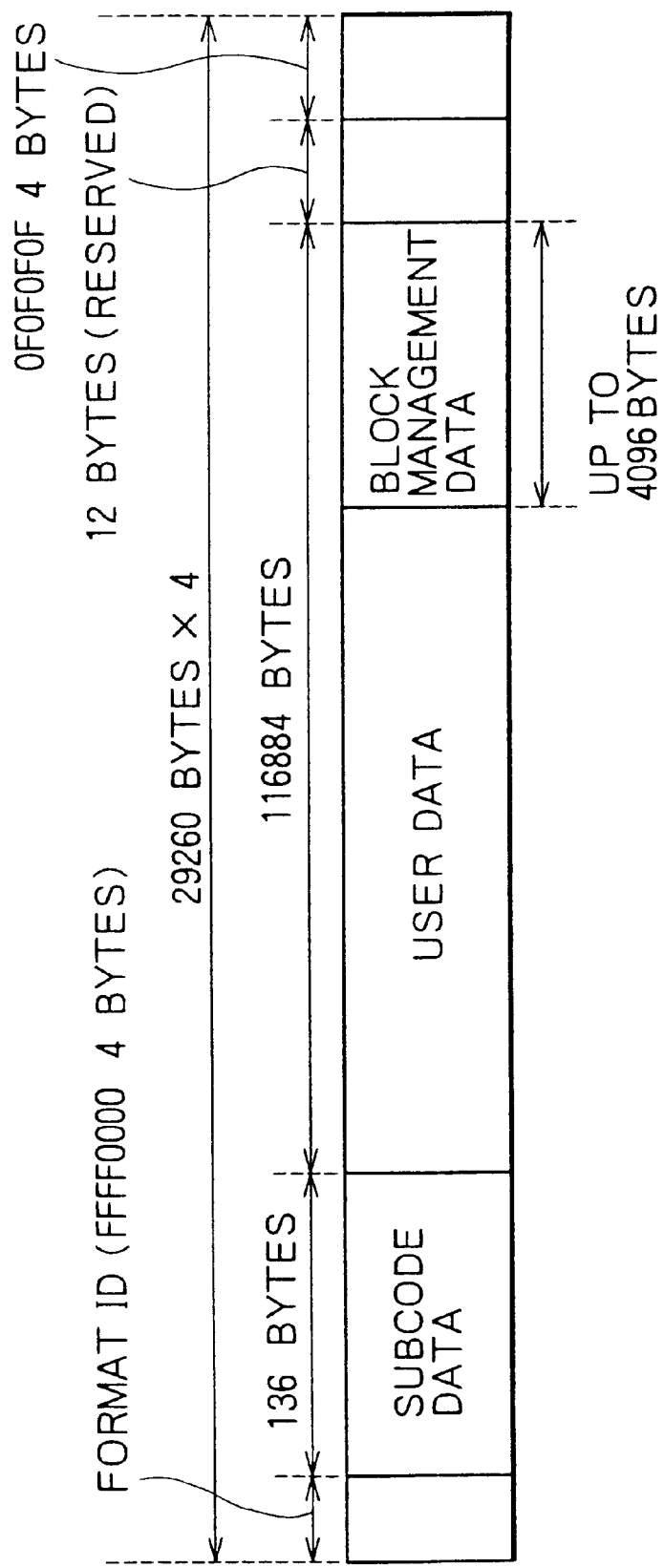
FIG. 7 is a schematic view illustrating a track set adopted by the tape streamer in FIGS. 3A and 3B.

FIG. 7 is a schematic view illustrating a structure of 117,040 bytes of data assigned to a single user track set. Each track set is headed by a four-byte format ID. As its name implies, the format ID is used for format identification, carrying a value "FFFF000h" in the case of this embodiment. The value indicates that user data have been recorded in units of four-track sets.

The four-byte format ID is followed by a 136-byte subcode that includes tables such as VSIT, VIT and BST (to be described later), user data track sets, ID data about tape mark track sets, and logical track set IDs. Track set management data and logical track set IDs are recorded in the subcode.

The subcode is followed by a data area which is 116,884 bytes long minus a block management table and which accommodates data such as user data. If this area is not entirely occupied by user data, dummy data are added to make up the shortfall.

The block management table is constituted by up to 4,096 bytes of data. This table contains data used to manage blocks each made up of track sets; it is in units of such track set blocks that data are recorded and reproduced to and from the tape streamer 3. The block management table is followed by 12 bytes of reserved data and by a four-byte EOD (end of data) indicating the end of a single track set.

As described, the tape streamer 3 records user data and various management-related data in units of track sets.

FIG. 8 is a schematic view showing an overall layout of the magnetic tape 10. On the magnetic tape 10, an LBOT (logical beginning of tape) is established at a predetermined distance in the direction of tape run from a PBOT (physical beginning of tape) following a leader tape originating from the tape reel. Likewise, an LEOT (logical end of tape) is located at a predetermined distance in the reverse direction of tape run from a PEOT (physical end of tape). Diverse data are recorded between the LBOT and the LEOT on the magnetic tape 10; regions near the leader tape where error rates are relatively high are avoided in recording. A stretch between the LBOT and the LEOT on a magnetic tape 10 constitutes one physical volume.

On the magnetic tape 10, a run-up area is formed over a predetermined distance from the LBOT. A magnetic tape transport mechanism is allowed to be servo-locked in the run-up area. Starting from the run-up area, tilted tracks are formed successively on the magnetic tape 10.

The run-up area is followed by recordings of a VSIT (volume set information table) headed by a physical track set ID in 0ID. The VSIT accommodates various data for managing the physical volume located between the LBOT and the LEOT. Specifically, the VSIT holds a volume name of the magnetic tape, names of files recorded on the tape, and a physical track set ID of a VIT (volume information table) assigned to each of the files. By gaining access to the VSIT, the tape streamer 3 can identify the magnetic tape 10 and ascertain contents and locations of the files recorded thereon. Each VSIT is made up of a single track set (1 ID), with the same contents recorded 10 times in succession to ensure a high level of reliability.

The VSIT recorded on the magnetic tape 10 is followed by a VSIT retry area corresponding to 90 IDs. The VSIT may be recorded repeatedly to this retry area as needed for recovery purposes.

The VSIT retry area on the magnetic tape 10 is followed by a location allowance band corresponding to a predetermined number of IDs. This band absorbs VSIT updates, leaving recorded data intact in the subsequent regions. A logical volume area is allocated between the location allowance band and the LEOT on the magnetic tape 10.

Figures 9A, 9B, 9C, 9D, 9E:
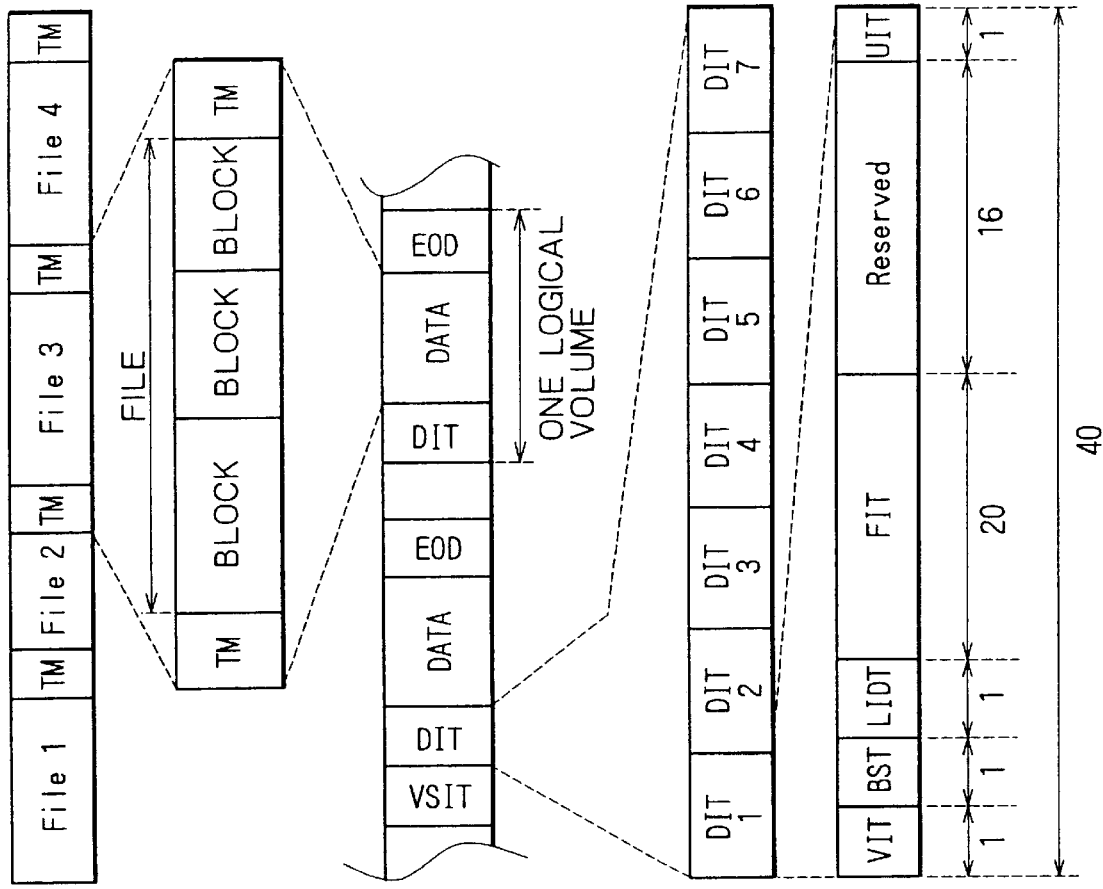
FIGS. 9A through 9E are schematic views picturing different volumes used by the tape streamer in FIGS. 3A and 3B.

FIGS. 9A through 9E are schematic views sketching logical volume contents assigned to the logical volume area. On the magnetic tape 10, data are recorded in units of files with a tape mark TM inserted as a delimiter code separating one file from another (FIG. 9A). Each file is made up of a plurality of blocks (FIGS. 9B and 9C).

The tape streamer 3 regards each file together with a DIT (directory information table) and an EOD (end of data) as a single logical volume. A DIT, 40 IDs long, is a table that manages each logical volume to which the DIT in question is assigned. As shown in FIG. 9D, seven DITs of the same contents corresponding to 40 IDs are recorded in a row to ensure an enhanced level of reliability.

Each DIT is headed by the run-up area discussed above in connection with FIG. 8, whereby the servo mechanism is locked in place. Another location allowance band comes behind, which absorbs updates as in the case of the VSIT and leaves recorded data intact in the ensuing regions.

As shown in FIG. 9E, each DIT comprises a VIT (volume information table) of 1 ID, a BST (bad spot table) of 1 ID, an LIDT (logical ID table) of 1 ID, a FIT (file information table) of 20 IDs, and a UIT (user information table) of 1 ID. The remaining region corresponding to 16 IDs in the DIT is reserved.

A VIT has its physical track set ID recorded in a VSIT, so that the VIT in question as well as the DIT as a whole may be accessed in reference to the VSIT record. Each VIT has its logical track set ID established to coincide with a physical track set ID. A VIT accommodates: a volume label of the logical volume to which the DIT in question is allocated, the first physical track set ID of a user track set, and the last physical track set ID.

The BST (bad spot table) holds information about coordinates of a region deemed unusable (i.e., bad spot) by the tape streamer 3 because of scratches or other damage to the magnetic tape 10. Specifically, if a hard-to-correct bit error results from a read-after-write or retry operation during recoding, the data for subsequent regions are recorded again onto the magnetic tape. The region to which the re-recorded data should have been written by the tape streamer 3 is defined as a bad spot. Each BST contains both a physical track set ID indicating the beginning of a bad spot, and a physical track set ID representing the end of the bad spot.

The LIDT (logical ID table) is used in a rapid block-by-block search. A file number, a physical track set ID and a block number are recorded in an LIDT at intervals of 200 logical track set IDs. Using the LIDT, the tape streamer 3 can roughly locate a target block and reach that block at high speed.

The FIT (file information table) is formed by recording a physical track set ID of a tape mark and a block number of the block in question. A UIT constitutes information (i.e., status data) about whether the volume in question has been updated. The status data are "FFFFFFFFn" before an update and "00000000h" thereafter.

4. Structure of the Tape Streamer

Figure 10:
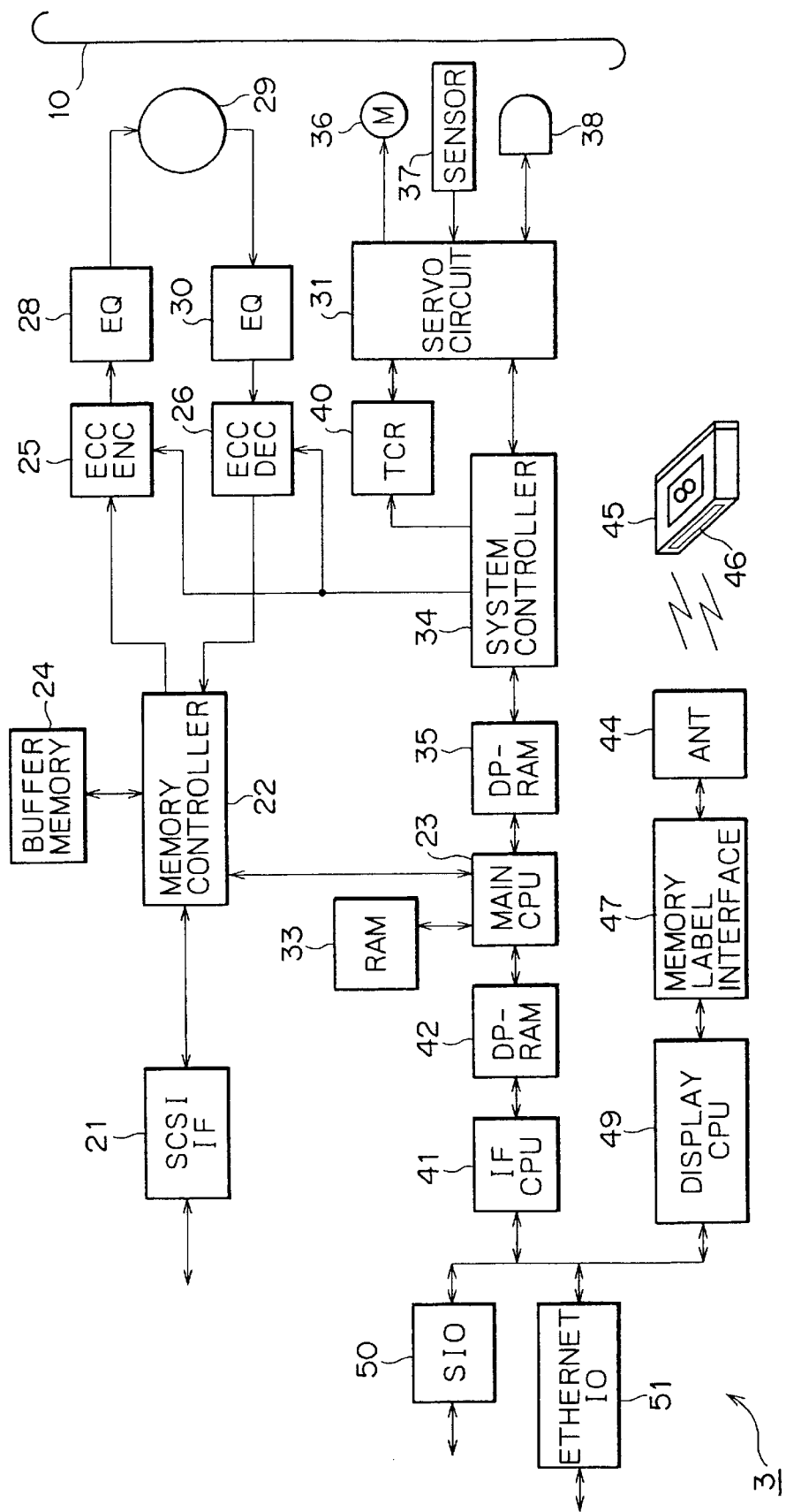
FIG. 10 is a block diagram of the tape streamer in FIGS. 3A and 3B.

FIG. 10 is a block diagram of the tape streamer 3 for use with the format described above. In the tape streamer 3, a SCSI interface (IF) 21 is connected to the CPU unit 5 by means of a SCSI interface line, or connected directly to the host computer 8 if the CPU unit 5 is not used. The SCSI interface 21 accepts write-ready user data and forwards them to a memory controller 22, and directs reproduced data from the memory controller 22 to the host computer 8.

Furthermore, the SCSI interface 21 sends to a main CPU part 23 commands coming from the CPU unit 5 and host computer 8 via the memory controller 22. Conversely, data such as status data from the main CPU part 23 are forwarded to the host computer 8 and CPU unit 5 by the SCSI interface 21.

The memory controller 22 causes a buffer memory 24 temporarily to retain user data admitted through the SCSI interface 21 and to output the retained data in properly timed relation with an ECC encoder (ECC/ENC) 25 in operation. Given such data as block management table data and the above-described DIT, the memory controller 22 admits the corresponding data from the main CPU part 23 and places the data temporarily into the buffer memory 24 before outputting them to the ECC encoder 25. Upon data reproduction, in suitably timed relation with an ECC decoder 26 (ECC/DEC) in operation, the memory controller 22 places data such as user data from the decoder into the buffer memory 24 for temporary storage therein; the data thus retained are later output to the SCSI interface 21. The above-described DIT and other data are directed from the ECC decoder 26 to the main CPU part 23. Results of error detection input together with the user data are reported to the main CPU part 23 upon access to the latter.

The buffer memory 24 is a bank memory with a bank structure that processes successively input user data in units of a predetermined number of track sets as described above. The tape streamer 3 thus carries out recording and reproduction as well as retry operations in units of a bank as part of the buffer memory 24. If user data fall short of a single bank in volume when recorded in track sets, these user data are supplemented with dummy data to make up the shortfall.

The ECC encoder 25 generates an error correcting code and/or a synchronizing pattern and attaches what is generated to data from the memory controller 22, thereby forming the ECC block discussed above in reference to FIG. 6. ECC block data are output by the ECC encoder 25 through a plurality of setups corresponding to magnetic head arrangements in place. The ECC encoder 25 outputs the data in a predetermined sequence to carry out track interleave and word interleave processing.

An equalizer 28 converts to serial data those data that are output by the ECC encoder 25 through the multiple setups corresponding to write head arrangements in place. The serial data are further converted to a format suitable for recording onto the magnetic tape 10. In so doing, the equalizer 28 generates drive signals to drive write heads mounted on a rotating drum 29.

The rotating drum 29 carries a predetermined number of write heads and as many read heads for scanning tracks formed by the write heads. Under control of a servo circuit 31, the rotating drum 29 rotates at predetermined revolutions. With the rotating drum 29 in operation, the tape streamer 3 forms tilted track consecutively along a magnetic tape 10 running at a predetermined speed, whereby data such as user data are recorded onto the tape. Recorded results may be monitored by use of the read heads.

During data recording or reproduction, an equalizer 30 receives reproduced signals from the read heads mounted on the rotating drum 29. The reproduced signals are subjected by the equalizer 30 to waveform equalization and demodulation, whereby data recorded on the magnetic tape 10 are reproduced.

The ECC decoder 26 receives data from the equalizer 30 and corrects their errors using error correcting codes attached to them during data recording. The ECC decoder 26 outputs the user data with their errors corrected to the memory controller 22, together with the results of error detection from the error correction process. In turn, the tape streamer 3 outputs data from the magnetic tape 10 through the buffer memory 24 to the host computer 8 and, if necessary, causes the main CPU part 23 to acquire data such as the VSIT.

The ECC decoder 26 sends the results of error detection thus obtained to the main CPU part 23 through the buffer memory 24. This in turn makes it possible to carry out retry and other operations as needed under control of the main CPU part 23. Upon recording of user data, the ECC decoder 26 only detects errors and records the results of error detection to the buffer memory 24 together with user data or the like. Later in a read-after-write operation, the recorded results of error detection permit checks on whether the recorded data are correct when reproduced. The ECC decoder 26 stores such results of error detection by setting suitable error flags in the buffer memory 24.

To implement these functions, the main CPU part 23 centers structurally on a CPU that secures a work area in a random access memory (RAM) 33 to carry out relevant procedures in response to commands input through the SCSI interface 21. The main CPU part 23 provides overall control of the tape streamer 3 and sends status data to the host computer 8 as needed. During processing, the main CPU part 23 gains access to the buffer memory 24 to acquire such data as the VSIT and DIT reproduced from the magnetic tape 10, and controls tape drives of the tape 10 based on the obtained information. After recording of user data, the main CPU part 23 controls overall operation so that the corresponding DIT and VSIT data are updated accordingly.

A system controller 34 controls mechanisms of the tape streamer 3 by exchanging data with the main CPU part 23 through a dual port RAM (DP-RAM) 35. In the tape streamer 3, a sensor 37 is attached illustratively to the cassette loading port and is used to determine whether the magnetic tape 10 can be loaded at a given point in time. The result of the detection is reported to the servo circuit 31. A capstan motor (M) 36 runs the magnetic tape 10 under control of the servo circuit 31. A fixed head 38 forms lengthwise tracks 10A and 10B along the magnetic tape 10, and outputs signals reproduced from the tracks 10A and 10B to the servo circuit 31.

In accordance with the result of tape cassette detection by the sensor 37, the servo circuit 31 permits insertion or ejection of the tape cassette by activating relevant drives, and loads or unloads the magnetic tape 10. The servo circuit 31 also rotates the rotating drum 29 and, based on what has been reproduced from the control track 10A in reference to rotating phases of the rotating drum 29, controls the rotating speed of the capstan motor 36 for tracking control. Upon data reproduction, the servo circuit 31 effects tracking control in reference to the tracking control pilot signal assigned to the tilted tracks on the magnetic tape 10.

Where the magnetic tape 10 is to be initialized, the servo circuit 31 drives the fixed head 38 while running the tape 10 at a predetermined speed so as to form lengthwise tracks 10A and 10B along the tape 10. Furthermore, the servo circuit 31 processes reproduced signals from the fixed head 38 so as to reproduce management data, and sends the reproduced data to the system controller 34. Time codes assigned to the management data are output to a time code recorder (TCR) 40.

During the initialization process, the time code recorder 40 generates time codes successively for output to the servo circuit 31. Given the time codes, and based on management data generated from diverse data coming from the system controller 34, the servo circuit 31 drives the fixed head 38 accordingly. Upon data recording or reproduction, the time codes generated by the servo circuit 31 are converted to track set IDs to be output.

In order to control the servo circuit 31, the system controller 34 causes the main CPU part 23 to forward the track set IDs output from the time code recorder 40 to the ECC encoder 25 and to other relevant components.

An interface CPU (IF CPU) 41 exchanges data with the main CPU part 23 through a dual port RAM (DP-RAM) 42. The interface allows tape cassette information to be acquired by the shelf unit 6A and elevator 6B and permits data communication with another computer system.

In the tape streamer 3, a reader-writer attached illustratively to the shelf unit 6A transmits radio waves from an antenna (ANT) 44 to an IC tag 46 mounted on the back of a tape cassette 45. Given a response from the IC tag 46, the reader-writer exchanges diverse data about the tape cassette 45 with the IC tag 46.

A display CPU 49 mediating between the interface CPU 41 and a memory label interface 47 exchanges therebetween the data that have been exchanged with the IC tag 46. On receiving data through the interface CPU 41, the display CPU 49 causes a suitable display screen to display relevant data. The displayed data typically include information about the tape cassette inserted into the tape streamer 3.

A serial IO (SIO) 50 is implemented illustratively as an RS-232C or RS-422 serial interface that exchanges maintenance information with an external device. An Ethernet IO 51 serves as an Ethernet interface which, when connected to a suitable network, exchanges various data with the tape streamer 3.

5. Loading and Unloading of Tape by the Tape Streamer

FIGS. 11A, 11B and 11C are schematic views outlining how the magnetic tape 10 is structured in preparation for getting loaded and unloaded. Specifically, the magnetic tape 10 is formatted to have unloading regions ARU0, ARU1, ARU2, etc., established thereon at constant intervals.

When the unloading regions ARU0, ARU1, ARU2, etc., are established, they are each given physical IDs indicative of a start and an end location under control of the main CPU part 23 so that track sets contiguous to these regions become large enough to forestall all adverse effects of any damage to the magnetic tape 10 upon loading or unloading.

Illustratively, where 40 track sets constitute a single block for this embodiment, 10 blocks are assigned to each of the unloading regions ARU0, ARU1, ARU2, etc.

When the magnetic tape 10 is positioned to a beginning of data relative to any one of the unloading regions ARU0, ARU1, ARU2, etc., by referring to physical IDs written to the lengthwise track 10B during recording, the user data in the previously recorded bank are recorded repeatedly up to an end of data regarding the region in question. Information serving as a reference pointing to the beginning of each unloading region is held in the data area of the VSIT. In this manner, the unloading regions are created one after another. While user data are being recorded onto the magnetic tape 10, the unloading regions ARU0, ARU1, ARU2, etc., are thus created concurrently. This eliminates the need for creating unloading regions apart from recording of user data.

The magnetic tape 10 has the unloading regions ARU0, ARU1, ARU2, etc., created intermittently throughout a logical volume area. The scheme makes it possible to let the magnetic tape 10 be loaded or unloaded when it is positioned somewhere other than at the beginning or end of the tape. After these unloading regions are established to allow the magnetic tape 10 to be loaded or unloaded as positioned other than at the beginning or end of the tape, the IC tag 46 attached to the tape cassette 45 has relevant VSIT and DIT data recorded therein as well.

Where the magnetic tape 10 has user data recorded repeatedly thereon to create the unloading regions ARU0, ARU1, ARU2, etc., other than at the beginning of end of the tape for use in loading and unloading, there may be cases in which a VSIT recorded previously in the direction of tape is left unchanged. In such cases, those contents of the VSIT and magnetic tape 10 which are placed in the IC tag 46 will become inconsistent with the recordings of the VSIT at the beginning of the tape. This bottleneck that could be experienced with the tape streamer 3 is bypassed by the operator separately updating the VSIT of the magnetic tape to ensure data consistency.

Of the unloading regions ARU0, ARU1, ARU2, etc., thus created, the tape streamer 3 selects one deemed to ensure the shortest access start time at a subsequent attempt to access the magnetic tape 10. The magnetic tape 10 is allowed to be unloaded as positioned to any one of the unloading regions thus selected.

FIG. 12 is a flowchart of steps constituting an unloading routine performed by the main CPU part 23. Given an unloading order from the host computer, the main CPU part 23 goes from step SP1 to step SP2. In step SP2, a check is made to see what mode is established preparatory to unloading. Such an unloading mode is designated either by operation of the control panel 5D at the CPU unit 5 or by instructions from the host computer. In addition to such designation, it is possible to read data representative of an unloading mode from the IC tag 46 attached to the tape cassette 45. In this case, the data are read from the IC tag 46 by the display CPU 49 and sent to the main CPU part 23 through the interface CPU 41.

If in step SP2 the main CPU part 23 detects a mean access time priority mode for attaining the shortest possible mean access time, then the main CPU part 23 goes from step SP2 to step SP3. In step SP3, as shown in FIGS. 11A and 11B, the main CPU part 23 computes a mean access time between the EOD of the last file on the magnetic tape 10 on the one hand and the physical ID designating a logical beginning of data (LBOD) on the tape on the other hand. The main CPU part 23 further detects the physical ID of an unloading region which is located closest to the computed physical ID and which comes immediately upstream of that ID. The magnetic tape 10 is rewound with respect to the physical ID of the unloading region thus determined. That is, the main CPU part 23 causes the magnetic tape 10 to be rewound and positioned to the unloading region located approximately in the middle of the target user data recorded on the tape.

With the magnetic tape 10 thus rewound, the main CPU part 23 reaches step SP4. In step SP4, the main CPU part 23 causes the magnetic tape 10 to be unloaded and the tape cassette to be ejected. The host computer is notified of the ejection of the tape cassette, before step SP5 is reached in which the unloading routine is terminated.

Before the magnetic tape 10 is loaded and accessed next time on the tape streamer 3, the access location on the tape may not be known. In such a case, the mean access time priority mode may be selected to unload the magnetic tape 10 preparatory to attaining a minimum mean access time in the subsequent access attempt.

In the case above, it is not known beforehand whether a file close to the beginning of the magnetic tape 10 or a file near its end is to be accessed next; the access time differs appreciably depending on where to reach next time on the tape. Nevertheless, if the tape cassette is ejected with its tape positioned to an intermediate location of the user data recorded thereon, then the mean access time will be the shortest next time the tape is loaded, whether the first file or the last file on the tape is to be accessed.

Suppose that user data are recorded up to a halfway location on the magnetic tape 10, as illustrated in FIG. 11A. In such a case, the magnetic tape 10 is unloaded as positioned to the unloading region ARU1, located immediately upstream of the intermediate location of the area where the user data have been recorded. Suppose now that files have been recorded up to the end of the magnetic tape 10, as sketched in FIG. 11B. In that case, the magnetic tape 10 is unloaded as positioned to the unloading region ARU3, located immediately upstream of the intermediate location of the tape. In either case, the mean access time will be the shortest next time any location on the magnetic tape 10 is accessed.

If in step SP2 the main CPU part 23 detects an external designation mode, then the main CPU part 23 goes from step SP2 to step SP6. In step SP6, the magnetic tape 10 is rewound up to the unloading region corresponding to the location ordered by the host computer. The main CPU part 23 receives from the host computer an order designating a logical location defined by a file number and a block number. Given the order, the main CPU part 23 causes the magnetic tape 10 to be rewound up to the unloading region that is closest in terms of access to the designated logical location. Step SP6 is followed by step SP4 in which the main CPU part 23 causes the magnetic tape 10 to be unloaded and the tape cassette to be ejected. In step SP5 following step SP4, the unloading routine is terminated.

That is, the host computer in some system configurations may more or less predict the target location on the tape to be accessed next. In such cases, as shown in FIG. 11C, the magnetic tape 10 is unloaded as positioned to ensure the shortest possible time in reaching the predicted data location in the next access attempt.

If in step SP2 an EOD mode is judged established, the main CPU part 23 goes to step SP7. In step SP7, the main CPU part 23 causes the magnetic tape 10 to run and be positioned to the unloading region immediately upstream of the EOD. Step SP7 is followed by step SP4 in which the main CPU part 23 causes the magnetic tape 10 to be unloaded and the tape cassette to be ejected. In step SP5, the unloading routine is terminated.

Some systems back up daily created data in sequence on the magnetic tape. For such systems, the tape should preferably be unloaded as positioned to the unloading region immediately upstream of the EOD from which the next recording session will be started. This ensures the shortest possible access time in reaching the target location in the next access attempt. The data streamer 3 then requires considerably less time for access than conventional setups.

When the tape streamer 3 is operated as described, the CPU unit 5 in the backup system 1 records one of the above-described unloading modes for each tape cassette. The CPU part 23 is notified of the unloading mode based on that record about each tape cassette. Illustratively, the mode record may be written to the IC tag 46. In this case, the CPU unit 5 sends data representative of the unloading mode to the display CPU 49 through the main CPU part 23 and interface CPU 41. In turn, the display CPU 49 writes the data in question to the IC tag 46 through the memory label interface 47 and antenna 44.

6. Operation of the Backup System

In the backup system 1 of the above-described constitution (FIGS. 1 and 2), a tape cassette taken from the shelf unit 6A under control of the CPU unit 5 is inserted into the tape streamer 3 and loaded. The fixed head 38 creates an ID track 10B and a control track 10A crosswise on the loaded magnetic tape 10 (FIGS. 4 and 10), whereby track set IDs each made of a time code identifying a track set are written to the tape as one sort of management data. With the magnetic tape 10 later rewound, a VSIT is recorded to the location at a predetermined distance from the leader tape as well as to the IC tag 46 mounted on the tape cassette 45 (FIG. 8). A volume name and other relevant data are recorded, which completes initialization. The tape cassette thus initialized is placed into a suitable location for storage in the shelf unit 6A under control of the CPU unit 5.

When the host computer 8 gives a data backup order, the corresponding tape cassette is taken out of the shelf unit 6A and set into the tape streamer 3 under control of the CPU unit 5 unless that cassette is already placed in the streamer. Any irrelevant tape cassette set in the tape streamer 3 is ejected therefrom and transferred to the shelf unit 6A.

With the tape cassette inserted into the tape streamer 3 as described, the magnetic tape is loaded and a VSIT is reproduced therefrom. The data from the VSIT are used to run the magnetic tape 10 so that the file designated by the host computer 8 may be accessed. Alternatively, the VSIT on the magnetic tape may be replaced by a VSIT retrieved from the IC tag 46, the retrieved VSIT data being used to run the magnetic tape 10 for access to the file specified by the host computer 8.

If a first file is to be recorded onto the magnetic tape 10, a DIT is written at a predetermined distance from a VSIT on the tape. Data coming from the host computer 8 are then recorded successively onto the magnetic tape 8. If data need to be added to a previously recorded file, the DIT of the file in question is either reproduced by referring to the VSIT records or acquired from the IC tag 46. The last end of block is detected from the DIT, so that the input data form the host computer 8 are recorded consecutively starting from that EOD. If a data reproduction order is given by the host computer 8, the corresponding file is detected from the VSIT for access to a relevant DIT. In accordance with DIT recordings, data is reproduced from the magnetic tape 10 (FIGS. 9A through 9E).

During data recording, user data that are successively input through the ECC encoder 25 are supplemented with error correcting codes in the form of product codes (FIG. 6). The ECC-supplemented data are subjected to track interleave processing involving four tracks constituting a single track set (FIGS. 5A and 5B), and written successively to the magnetic tape 10 through word interleave processing. The data are further recorded onto the magnetic tape 10 in units of banks established in the buffer memory 24.

In the tape streamer 3 (FIG. 12), the four recording tracks formed on the magnetic tape 10 are set to a single track set. Under bank control of the buffer memory 24, the user data are recorded consecutively in units of, say, eight track sets representing a single bank. The user data are also recorded with each track set assigned a logical ID which identifies the track set and whose value is incremented for each additional track set allocated to the user data.

In the recording process, the tape streamer 3 records some user data over a predetermined distance before re-recording the same user data over the same distance. Such repetitive recording creates unloading regions ARU1, ARU2, etc., (FIGS. 11A, 11B, 11C) intermittently on the magnetic tape 10. As a result, the tape streamer 3 allows the magnetic tape 10 to be unloaded and ejected as positioned to an unloading region other than the beginning or end of the tape. Compared with conventional setups whereby the magnetic tape 10 is rewound to its beginning or fast forwarded to its end before being unloaded, the inventive scheme deals with tape cassettes in an appreciably fast and sequential manner.

When the tape streamer 3 is set in the mean access time priority mode preparatory to unloading at unloading regions ARU1, ARU2, etc., the magnetic tape 10 is unloaded after being positioned selectively to the unloading region immediately upstream of a point substantially in the middle of a stretch between the end of user data (EOD) and a beginning of data (BOD) on the magnetic tape. Where a destination to be accessed next is not known, the mean access time is made the shortest if the magnetic tape is positioned as described. This can amount to a significant drop in mean access time compared with access times of conventional setups.

The host computer in some system configurations can predict which file to access next. In such cases, the tape streamer 3 is set in the external designation mode. This allows a relevant magnetic tape in the tape streamer 3 to be positioned selectively to an unloading region such as to minimize the time in gaining access to the file designated by the host computer. Where the target tape location to be accessed next by the tape streamer 3 is known to the host computer, the tape in question is positioned in a manner making the access time appreciably shorter than in conventional cases.

For sequential data backup recording, the tape streamer 3 is set in the EOD mode. This allows the tape streamer 3 to position the magnetic tape to the unloading region immediately upstream of the EOD before unloading the tape. Where the next tape location to be accessed next is known to the host computer, the EOD mode when established also makes it possible to minimize access time in the subsequent access attempt. This too can amount to a significant drop in access time compared with access time requirements of conventional schemes.

As described, the magnetic recording and reproducing apparatus and magnetic tape accessing method embodying the invention allow a magnetic tape to be unloaded as positioned selectively to any one of unloading regions created at predetermined intervals along the tape, the selected unloading region being located approximately in the middle of a lengthwise tape area where user data have been recorded. The embodiment of the invention allows a desired file on the tape to be accessed much faster than conventional setups.

The inventive apparatus and method also permit selection between two unloading regions to which the magnetic tape is positioned before being unloaded from the tape streamer. One of the two regions is located approximately in the middle of the user data-packed tape area, the other region designated by the host computer. This allows the magnetic tape to be unloaded as required by the host computer for subsequent access at a significantly higher speed than conventional methods of tape unloading.

Although the embodiment above was shown allowing the magnetic tape to be unloaded as positioned to an end of user data (EOD), to an intermediate location of the user data area, or to an unloading region designated by the host computer, this is not limitative of the invention. Alternatively, the magnetic tape in each of a plurality of tape cassettes may be set to a position from which to start subsequent access upon insertion, and such tape position settings may be tallied up to constitute a basis for selecting suitable unloading regions on the cassettes.

Whereas the embodiment above was shown establishing unloading regions by recording user data in repetitive fashion, this is not limitative of the invention. Alternatively, the invention also applies extensively where unloading regions are established by repeating tape marks or EODs.

While the embodiment above was described as using four tracks to make up a single track set, this is not limitative of the invention. Any multiple tracks other than the four tracks may be utilized to constitute a single track set.

Although this invention has been described as applicable to the tape streamer in combination with tape transport mechanisms, this is not limitative of the invention. The invention also applies extensively to tape streamers that are directly connected to a host computer or other entities.

Whereas the embodiment above was shown recording computer-generated data, this is not limitative of the invention. Alternatively, the invention applies extensively to set-ups whereby video and/or audio signals are handled.

As many apparently different embodiments of this invention may be made without departing from the spirit and scope thereof, it is to be understood that the invention is not limited to the specific embodiments thereof except as defined in the appended claims.

What is claimed is:

1. A magnetic recording and reproducing apparatus for loading a magnetic tape by drawing the tape out of a tape cassette and successively forming tilted tracks on said magnetic tape to record user data thereon, the apparatus comprising:

recording means for successively recording said user data starting from a beginning of said magnetic tape while recording suitable data onto said magnetic tape at predetermined intervals so as to form unloading regions to which said magnetic tape is positioned before being unloaded into said tape cassette; and unloading means which, given an order signal of a first operation mode, positions said magnetic tape to one of said unloading regions which is situated adjacent to a substantially intermediate point between an end of the recorded user data and a beginning of said recorded user data along said magnetic tape, said unloading means further unloading said magnetic tape thus positioned into said tape cassette;

wherein said unloading means, given an order signal of a second operation mode, further positions said magnetic tape to one of said unloading regions which is designated by an external device, said unloading means further unloading said magnetic tape thus positioned into said tape cassette.

2. A magnetic recording and reproducing apparatus according to claim 1, wherein said tape cassette housing said magnetic tape has memory means for storing data representative of either said first operation mode or said second operation mode;

wherein said magnetic recording and reproducing apparatus further comprises data writing/reading means for writing or reading data to or from said memory means; and wherein said data writing/reading means writes to said memory means data about the location of the unloading region at which said magnetic tape is unloaded by said unloading means in response to said data representative of either said first operation mode or said second operation mode.

3. A magnetic recording and reproducing apparatus according to claim 1, wherein said recording means records a plurality of identical pieces of user data to a recording region making up each of said unloading regions.

* * * * *